(12) United States Patent
Kumar et al.

(10) Patent No.: US 11,010,391 B2
(45) Date of Patent: May 18, 2021

(54) DOMAIN AGNOSTIC SIMILARITY DETECTION

(71) Applicant: SAP SE, Walldorf (DE)

(72) Inventors: Srinivasan Kumar, Sunnyvale, CA (US); Michael Alexander, San Jose, CA (US); Shibajee Dutta Gupta, Palo Alto, CA (US); Jeffrey Woody, Onalaska, WI (US); Kimberly Starks, Fairfield, OH (US); Prasanthi Thatavarthy, Onalaska, WI (US)

(73) Assignee: SAP SE, Walldorf (DE)

( * ) Notice: Subject to any disclaimer, the term of this patent is extended or adjusted under 35 U.S.C. 154(b) by 623 days.

(21) Appl. No.: 14/984,902

(22) Filed: Dec. 30, 2015

(65) Prior Publication Data

US 2017/0192974 A1 Jul. 6, 2017

(51) Int. Cl.
*G06F 16/24* (2019.01)
*G06F 16/2457* (2019.01)

(52) U.S. Cl.
CPC .............................. *G06F 16/24578* (2019.01)

(58) Field of Classification Search
CPC ................................................ G06F 16/24578
See application file for complete search history.

(56) References Cited

U.S. PATENT DOCUMENTS

| | | | | |
|---|---|---|---|---|
| 5,893,097 A * | 4/1999 | Hayata | ................... | G06F 16/252 |
| 8,838,875 B2 * | 9/2014 | Park | ....................... | G06F 3/0623 |
| | | | | 711/103 |
| 2005/0283473 A1 * | 12/2005 | Rousso | ............... | G06F 16/3322 |
| 2009/0319880 A1 * | 12/2009 | Collie | ..................... | G06F 40/18 |
| | | | | 715/219 |
| 2010/0106724 A1 * | 4/2010 | Anderson | ......... | G06F 16/24544 |
| | | | | 707/737 |
| 2011/0153979 A1 * | 6/2011 | Boyle | ................. | G06F 16/2246 |
| | | | | 711/209 |
| 2012/0066193 A1 * | 3/2012 | King | ................... | G06F 12/0269 |
| | | | | 707/704 |
| 2013/0282676 A1 * | 10/2013 | Wade | ...................... | G06F 3/064 |
| | | | | 707/692 |
| 2015/0124926 A1 * | 5/2015 | Choi | .................... | H03K 21/023 |
| | | | | 377/53 |
| 2015/0143032 A1 * | 5/2015 | Hashimoto | .......... | G06F 3/0619 |
| | | | | 711/103 |
| 2015/0356094 A1 * | 12/2015 | Gorelik | ................. | G06F 16/211 |
| | | | | 707/748 |
| 2016/0004631 A1 * | 1/2016 | Hayes | ..................... | G06F 16/00 |
| | | | | 711/103 |
| 2016/0117105 A1 * | 4/2016 | Thangaraj | ............. | G06F 3/0625 |
| | | | | 711/103 |
| 2018/0074951 A1 * | 3/2018 | Feigin | ................. | G06F 11/1076 |

* cited by examiner

*Primary Examiner* — Eliyah S. Harper
(74) *Attorney, Agent, or Firm* — Mintz Levin Cohn Ferris Glovsky and Popeo, P.C.

(57) ABSTRACT

A processing tool is described that can evaluate a plurality of fields in a plurality of records and assign a scoring measure to each field based on the evaluation of each field. The scoring measures can provide an indication as to the uniqueness in content within each field, which can assist with determining one or more fields that are most useful for performing a search to identify similar records.

15 Claims, 5 Drawing Sheets

| dessert name | main ingredient | price | quantity | SKU |
|---|---|---|---|---|
| apple pie | apple | $ 5.00 | 10 | 1111 |
| apple strudel | apple | $ 5.00 | 12 | 1112 |
| chocolate cake | chocolate | $ 6.00 | 13 | 1113 |
| banana cream pie | banana | $ 6.00 | 11 | 1114 |
| pumpkin pie | pumpkin | $ 5.00 | 15 | 1115 |
| caramel apples | apple | $ 5.00 | 10 | 1116 |

FIG. 1

DOMAIN AGNOSTIC SIMILARITY DETECTION

TECHNICAL FIELD

The subject matter described herein relates to assigning scoring measures to fields for assisting with detecting similar records.

BACKGROUND

A fuzzy search is a type of search that can return search results that are not exact matches of a search term used to perform the search. For example, a fuzzy search of the search term "plant" can produce results such as "planters", "plantations", or even "plans". As such, fuzzy searching can assist with providing search results where the search term was misspelled, where a range of search results are acceptable, and/or where definite search results are not yet understood or defined. Syntax can be included in a search term for assisting with performing a fuzzy search, such as for defining parts of the search term that are to be included in the search results and parts of the search term that can be variable. This can also assist with varying the amount of fuzziness in the search, such as how similar the search results must be to the defined part of the search term. Although fuzzy searching can provide some searching benefits, fuzzy searching multiple records having multiple fields can be complex and require expertise from a user in order to retrieve desired search results.

SUMMARY

Aspects of the current subject matter can include a processing tool that evaluates fields in a plurality of records and assigns a scoring measure to each field based on the evaluation of each field. The scoring measures can provide an indication as to the uniqueness in content related to each field, which can assist with determining one or more fields that are most useful for performing a search to identify similar records.

In one aspect, a method includes evaluating the contents of each field of a plurality of fields in a table or file. The evaluating can include determining a value reflective of a uniqueness of content contained within each field. The method can further include assigning a scoring measure to each field. The scoring measure can include the value reflective of the uniqueness of content contained within each field. In addition, the method can include sorting the plurality of fields based on the assigned scoring measures and selecting, based on the assigned scoring measures, one or more fields. Additionally, the method can include executing a fuzzy search based on the at least one selection.

In optional variations, one or more of the following features can be included in any feasible combination. For example, the method can further include receiving an identifier of a table or a file comprising a plurality of records having a plurality of fields. The selecting can be automated by the system or carried out by a user. The automated selecting can be based on a defined range of acceptable scoring measures. The method can further include outputting a result of the fuzzy search, the result comprising at least two records including at least one field having similar content. The selecting can further include identifying one or more fields having a higher scoring measure compared to at least one other field and selecting at least one of the one or more fields having the higher scoring measure. The scoring measure can be calculated using the following equation:

$$S_j = -\sum_{i=1}^{N} p_i \log p_i$$

Systems and methods consistent with this approach are described as well as articles that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 1 shows a diagram illustrating features of a table including a plurality of records having a plurality of fields that can be evaluated and assigned a scoring measure using a processing tool consistent with implementations of the current subject matter;

When practical, similar reference numbers denote similar structures, features, or elements.

DETAILED DESCRIPTION

Figure 2:
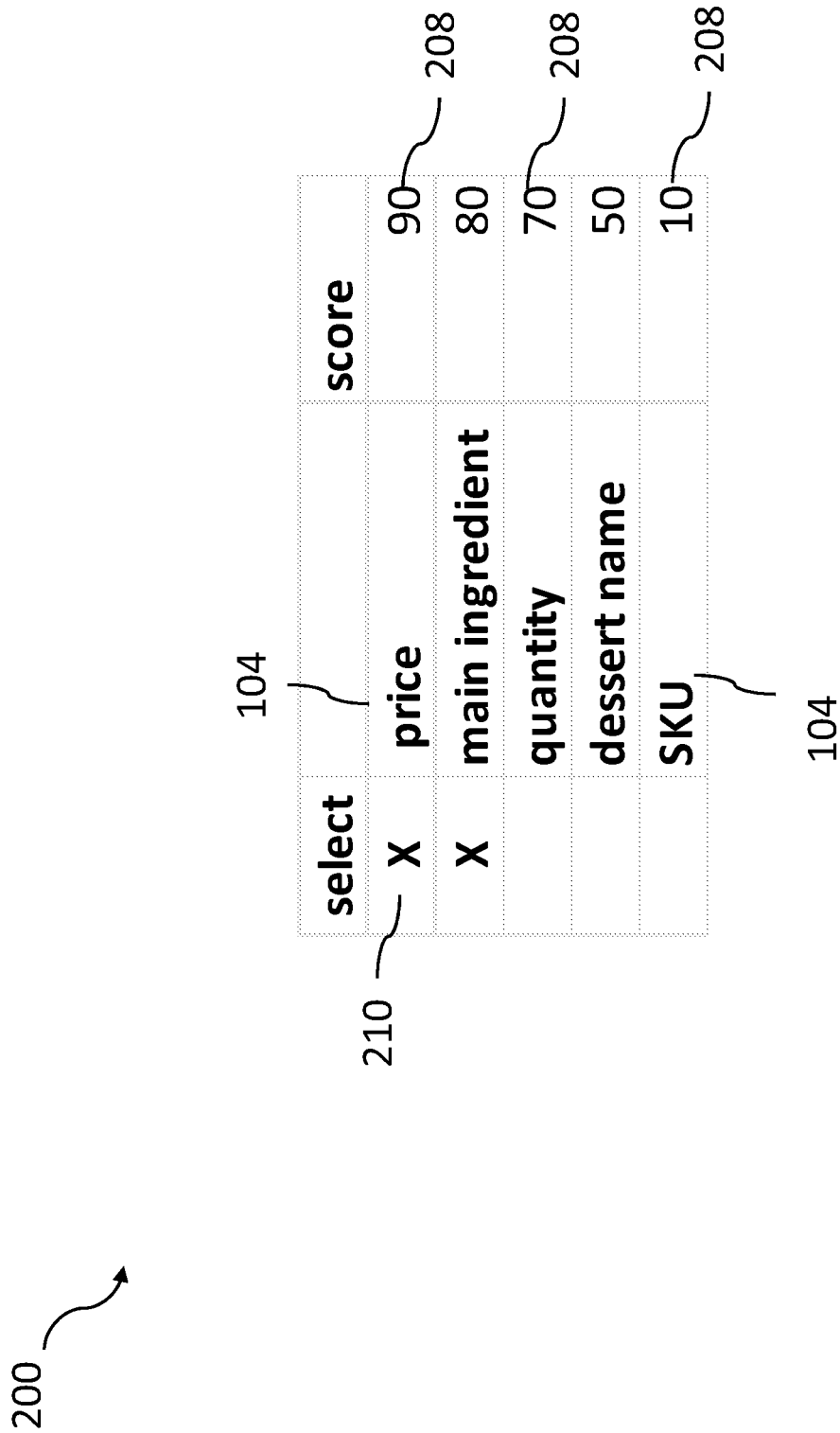
FIG. 2 shows a diagram illustrating a results table provided by the processing tool, which includes the scoring measures assigned to each field of the table in FIG. 1, the results table can allow a user to select, based on the assigned scoring measures, one or more fields to include in a subsequent search of the table for identifying similar records.

The current subject matter relates to a processing tool that can evaluate a plurality of records each having a plurality of fields to allow for a simplified and efficient way to identify similar records among the plurality of records. For example, the processing tool disclosed herein can evaluate one or more fields or columns containing data associated with a plurality of records. Each field can be evaluated in order to calculate and assign a scoring measure to each field. The scoring measure can indicate how unique the contents are within each field. For example, a field that contains all unique content, such as a field containing social security numbers, can receive a low score. In contrast, a field that has at least some content within the field that is the same between one or more records can be assigned a higher score. These assigned scores can be used by either a processor (such as in an automated process) or a user for determining whether such fields are to be used when determining which of a plurality of records are the same or similar. The processing tool of the present subject matter can thus assist with determining appropriate or useful fields for determining records that have the same or similar content without requiring a priori knowledge or understanding regarding the type of content contained within each field.

As used herein, when records or fields (such as columns) are described as being similar, the content therein can have either the exact same content or can include content that has one or more similarities. For example, a field in a first record that contains the word "apple" and another field in a second record containing the word "apple pie" can be similar because they both contain the word "apple". Other factors can contribute to contents being similar, such as containing overlapping values (e.g., time, price, date, quantity, etc.). Additionally, as used herein, the term uniqueness indicates a level of how many of the same or similar terms are present in a field. For example, a field including social security numbers for a hundred people will be unique because there are, at best, only numbers that are close to each other, but none that are the exact same. However, a field that is less unique has more content that is the same and/or similar.

The processing tool described herein can be fully automated or can include one or more steps that require or request user input. For example, the processing tool can prompt a user to determine which fields to analyze for assigning scoring measures, as well as which fields to include in a fuzzy search that identifies similar records. The user can, for example, observe the scoring measures assigned by the processing tool to each of the fields and select, such as based on their respectively assigned scoring measures, which fields to include when determining which records are similar. The processing tool can also fully automate the process of identifying similar records by evaluating the scoring measures assigned to each filed. The processing tool can then include only fields that receive a scoring measure that is within a predefined range. Such ranges can be set by the user before or at runtime, for example.

Once fuzzy search results are provided, thereby indicating which records are similar, the processing tool can allow further processing and analysis of the records and fields. For example, the processing tool can allow for a field to be added or removed from the fuzzy search in order to increase or decrease the number of fuzzy search results.

Some conventional approaches for identifying similar records require human expertise and visual inspection of the data included in the records in order to identify similarities between records. This can be very time consuming and require a person having expertise with the data provided in the records, as well as expertise with how to refine and operate an effective fuzzy search. As such, the processing tool disclosed herein provides several benefits over conventional approaches, including increasing efficiency and effectiveness in identifying similar records, as well as allowing for a numerical based (i.e., calculated) and logical approach for determining which of a plurality of fields are most beneficial for including in a fuzzy search identifying similar records.

FIG. 1 shows a diagram illustrating features of a table 100 including a plurality of records 102 having a plurality of fields or columns 104 that can be evaluated by a processing tool of the present subject matter. The processing tool can evaluate the table 100, such as one or more of the fields 104 and assign a scoring measure to each of the evaluated fields 104. The scoring measure can identify the uniqueness in content contained within the associated field 104.

The scoring measure can be calculated for each field using the following calculation (devised by mathematician Claude Shannon in 1948):

$$S_j = -\sum_{i=1}^{N} p_i \log p_i$$

In the above formula, the left side of the equation is the columnar uniqueness of the j-th column, which is referred to herein as the scoring measure. As indicated in the right side of the equation, the total number of distinct values in the column is N, and p denotes the probability of the i-th value, which can be the frequency of that value as a fraction of the total number of records.

As shown in FIG. 2, the processing tool can create and display a results table 200 that includes scoring measures 208 assigned to each field 104 of the table 100. The results table 200 can rank the fields, such as by displaying the field 104 assigned the highest scoring measure 208 on top and the remaining fields in descending order. This can allow a user to quickly determine which of the fields 104 have content with the most similarities or are least unique.

The results table 200 can also include a user input 210 that can allow a user to select which of the fields 104 the user would like the processing tool to use when performing a search or fuzzy search of the table, such as to find similar records. As shown in FIG. 2, the user can select one or more fields 104 for performing such search. This allows a search to be performed among a plurality of records having a plurality of fields 104 to identify similar records without having to search through and compare every field. Furthermore, the fields 104 that are used to perform the search have been logically and numerically identified (i.e., via scoring measures 208) for facilitating the identification of similar records in an efficient and effective manner.

In general, a field 104 that is assigned a high scoring measure 208 can be meaningful in that it contains at least some similar content between records, and therefore is recommended for including when performing the search for finding similar records. In contrast, a scoring measure 208 that is low is generally meaningless when it comes to identifying fields that are useful for including in a search that is performed for identifying similar records.

The processing tool can detect and identify similar records using the selected fields 104, as well as based on a level of fuzziness of search that can be either pre-programmed or defined at runtime. For example, in some implementations, a user can define a level of fuzziness, with one end of the spectrum resulting in search results being more similar and the other end of the spectrum resulting in search results that are less similar. Prior to the fuzzy search being run, the user can indicate the level of fuzziness of the search (e.g., via a prompt provided by the processing tool, such as a sliding scale indicating selectable levels of fuzziness). Furthermore, after the search is conducted, the fuzziness of the search can be adjusted, such as by a user if the user would like to see more or less results. The fuzziness of the search can also be automated and/or automatically adjusted to provide a number (or number range) of search results. For example, the fuzziness can be automatically adjusted such that less than 50, but more than 25 results are produced as a result of the fuzzy search.

When performing the fuzzy search, the processing tool can concatenate the selected fields. In addition, names can be applied to any fields that do not have a name in order to maintain their identity. The fuzziness selected by the user or set by the processing tool can then be applied to the fuzzy search and a Structured Query Language (SQL) can be run. An example SQL can include the following:

```
select score( ), "CONCAT_RESULTANT_COLUMN", * from
TABLE_CONTAINING_RECORDS
    where CONTAINS("DESCRIPTION", 'Apple', FUZZY(0.2))
    limit 100
```

This can result in a similar set of records based on the fields and fuzziness selected. The results can be examined and, for example, a user can select records from the results for comparison. The processing tool can then alter the SQL to pick a union or intersection of the result sets of the SQL driven by each of the records selected by the user. In some implementations, user selections and/or preferences can be stored, such as for recurring use.

The SQL of the fuzzy search can be simplified by recognizing that the processing tool only has to work with the selected fields. The formula can be rewritten as follows:

$$= -\frac{1}{N}\sum_{i=1}^{N} n_i(\log n_i - \log N)$$

$$= -\frac{1}{N}\sum_{i=1}^{N} n_i \log n_i + \frac{1}{N}\sum_{i=1}^{N} n_i \log N$$

$$= -\frac{1}{N}\sum_{i=1}^{N} n_i \log n_i + \log N$$

$N \leftarrow$ SELECT COUNT(*) FROM TABLE $n_i \leftarrow$ SELECT FIELD,

COUNT(FIELD) FROM TABLE GROUP BY FIELD

The present subject matter can reduce numerical errors resulting from numerous divisions by only performing a single division. In contrast, for example, calculating probabilities for each item in a field can require multiple calculations, including dividing each item by the number of total items in the field. This greater number of divisions can result in greater numerical errors. As such, the present subject matter can reduce numerical errors.

Figure 3:
FIG. 3 shows an output menu that allows a user to select one or more types of output for search results using the processing tool.

FIG. 3 shows an output menu created and displayed by the processing tool that allows a user to select one or more types of output 312 for the search results. For example, a user can select the results of the search using the identified fields (such as shown in FIG. 2) to be exported to a spreadsheet. Any number of a variety of export targets and outputs are included within the scope of the present disclosure. Furthermore, the output of the search results can include a variety of annotations, for example, that can assist with identifying various features contained within the output.

Figure 4:
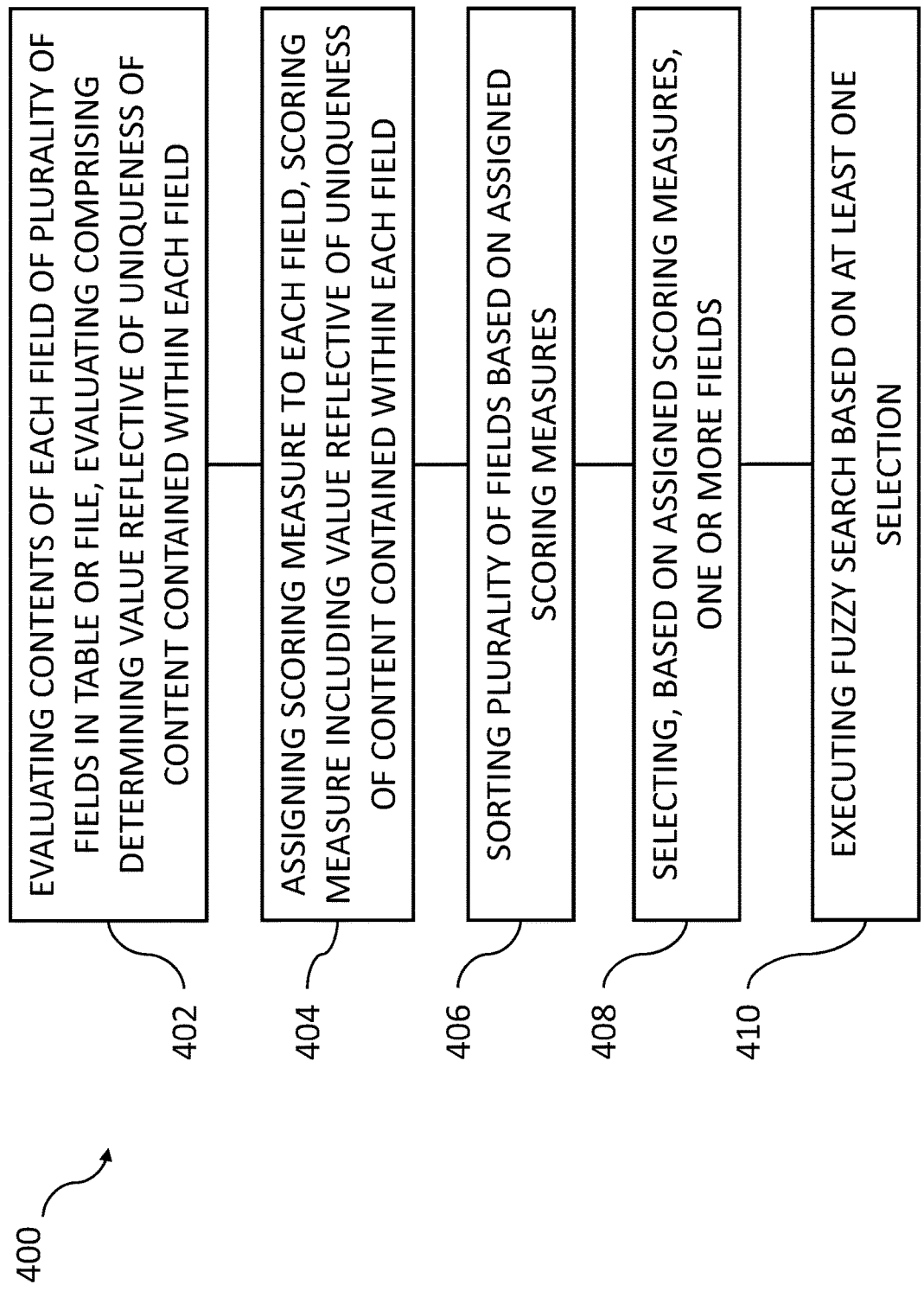
FIG. 4 shows a process flow diagram illustrating aspects of a method having one or more features consistent with implementations of the current subject matter.

FIG. 4 shows a process flow chart 400 illustrating features of a method consistent with one or more implementations of the current subject matter. It will be understood that other implementations may include or exclude certain features. At 402, the contents of each field of a plurality of fields in a table or file can be evaluated. The evaluating of the contents can include determining a value reflective of a uniqueness of content contained within each field. At 404, a scoring measure can be assigned to each field. The scoring measure can include the value reflective of the uniqueness of content contained within each field. At 406, the plurality of fields can be sorted based on the assigned scoring measures. At 408, one or more fields can be selected based on the assigned scoring measures. At 410, a fuzzy search can be executed based on the at least one selection.

Figure 5:
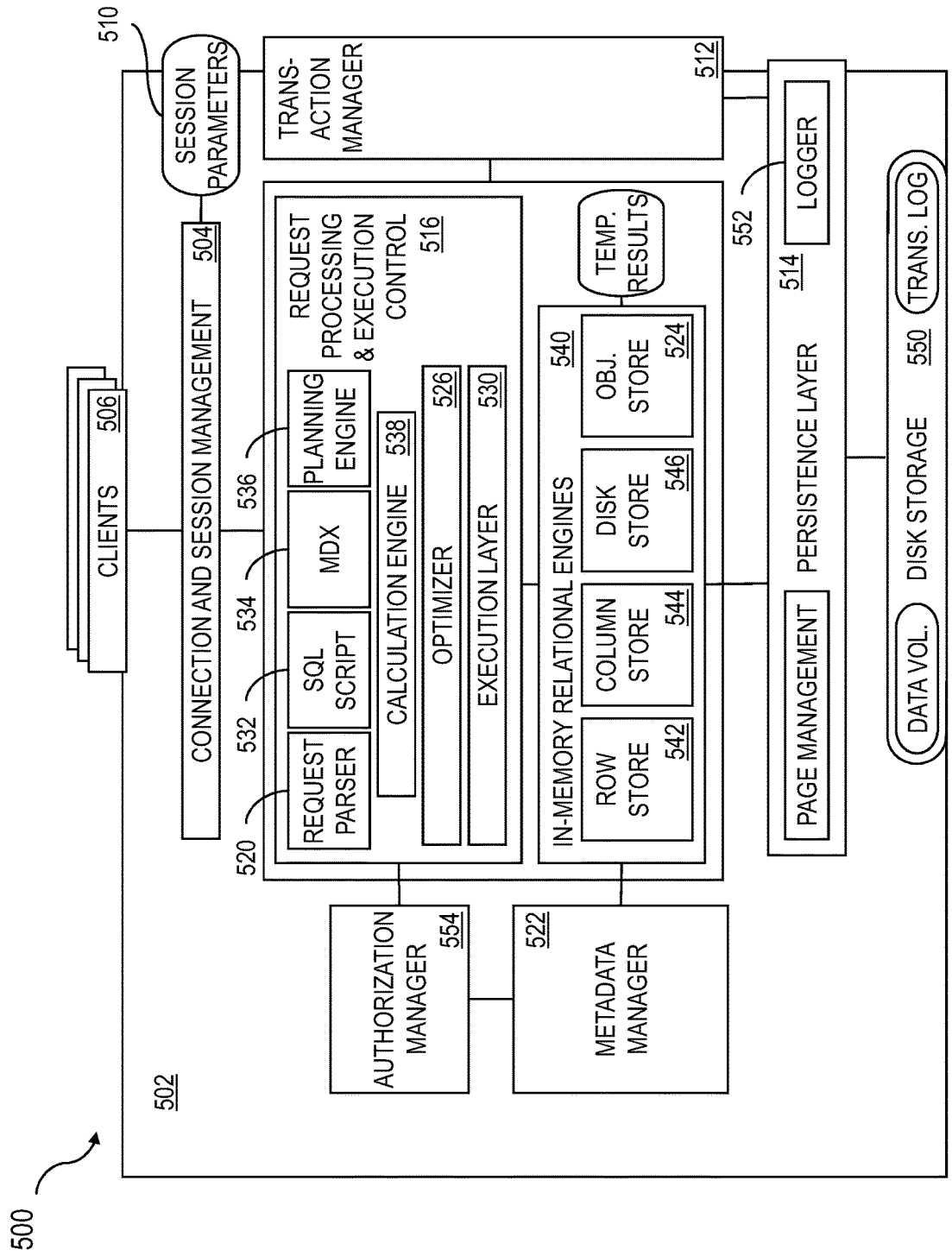
FIG. 5 shows a diagram illustrating features of a database management system architecture consistent with at least some implementations of the current subject matter.

FIG. 5 shows a diagram illustrating features of an example environment in which the subject matter described herein can be implemented. It will be appreciated that other environments can be utilized including variations of the environments illustrated in FIG. 5. In particular, FIG. 5 shows a block diagram of an in-memory relational database server 500 consistent with some implementations of the current subject matter. The in-memory relational database server 500 can be implemented on one or more computing systems that include one or more programmable processors (e.g. physical, hardware-based processors). A connection and session management component 502 of an in-memory database system 504 creates and manages sessions and connections for the database clients 506. For each session, a set of parameters 510 is maintained, such as for example auto commit settings or the current transaction isolation level. Once a session is established, database clients 506 can use logical (e.g. SQL) statements to communicate with the in-memory database system 504. For analytical applications, the multidimensional query language (MDX) can also be supported.

Each statement can be processed in the context of a transaction. New sessions can be implicitly assigned to a new transaction. A transaction manager 512 can coordinate transactions, control transactional isolation, and keep track of running and closed transactions. When a transaction is committed or rolled back, the transaction manager 512 can inform the involved engines about this event so they can execute necessary actions. The transaction manager 512 can cooperate with a persistence layer to achieve atomic and durable transactions.

Requests received from the database clients 506 can be analyzed and executed by a set of request processing and execution control components 516, which can include a request parser 520 that analyses a request from a database client 506 and dispatches it to a responsible component. Transaction control statements can, for example, be forwarded to the transaction manager 512, data definition statements can be dispatched to a metadata manager 522 and object invocations can be forwarded to an in-memory object store 524. Data manipulation statements can be forwarded to an optimizer 526, which creates an optimized execution plan that is provided to an execution layer 530. The execution layer 530 can act as a controller that invokes the different engines and routes intermediate results to a next phase in execution of the execution plan.

Built-in support can be offered for domain-specific models (such as for financial planning) scripting capabilities that allow to run application-specific calculations inside an in-memory database system. A scripting language, for example SQL Script 532, which is based on side effect free functions that operate on tables using SQL queries for set processing, can be used to enable optimizations and parallelization. The MDX language 534 can be used to provide support for multidimensional queries. A planning engine 536 can allow financial planning applications to execute basic planning operations in the database layer. An example of a basic planning operation is to create a new version of a data set as a copy of an existing one while applying filters and transformations. For example, planning data for a new year can be created as a copy of the data from the previous year. This operation requires filtering by year and updating the time dimension. Another example of a planning operation can be a disaggregation operation that distributes target values from higher to lower aggregation levels based on a distribution function.

Features such as SQL Script 532, MDX 534, and planning engine 536 operations can be implemented using a common infrastructure called a calculation engine 538. Metadata can be accessed via the metadata manager component 522. Metadata can include a variety of objects, such as for example definitions of relational tables, columns, views, indexes, SQL Script functions, object store metadata, and the like. All of these types of metadata can be stored in a common catalog for all stores (in-memory row store, in-memory column store, object store, disk based). Metadata can be stored in tables in row store. In multi-tenant systems and in distributed systems, central metadata can be shared across servers and tenants as discussed in greater detail below. How metadata is stored and shared can be hidden from the components that use the metadata manager 522.

One or more relational engines 540, for example an in-memory row store 542, an in-memory column store 544, a disk-based store 546, and the in-memory object store 524 mentioned above can communicate with the request processing and execution control components 516, the metadata manager 522, and the in-memory persistence layer 514. The row store 542 and column store 544 are each relational in-memory data engines that can store data in a row-based or column-based way, respectively. Some data, such as for example tracing data, need not be kept in memory all the time. The disk-based store 546 can handle such data. Data in the disk-based store 146 can be primarily stored in disk storage 550 and only moved to memory buffers (e.g. the persistence layer 514) when accessed.

When a table is created, the table can be specified in the store in which it is located. Tables can be moved to different stores at a time after their creation. Certain SQL extensions can optionally be available only for specific stores (such as for example the "merge" command for a column store). However, standard SQL can be used on all tables. It is also possible to combine tables from different stores in one statement (e.g. using a join, sub query, union, or the like).

As row based tables and columnar tables can be combined in one SQL statement, the corresponding engines must be able to consume intermediate results created by the other. Two engines can differ in the way they process data. Row store operations, for example, can process data in a row-at-a-time fashion using iterators. Column store operations (such as for example scan, aggregate, and so on) can require that the entire column is available in contiguous memory locations. To exchange intermediate results, a row store can provide results to a column store materialized as complete rows in memory while a column store can expose results using the iterator interface needed by a row store.

The persistence layer 514 can be responsible for durability and atomicity of transactions and can ensure that the database is restored to the most recent committed state after a restart and that transactions are either completely executed or completely undone. To achieve this goal in an efficient way, the persistence layer 514 can use a combination of write-ahead logs, shadow paging and save points. The persistence layer 514 can offer interfaces for writing and reading data and can also contain a logger 552 that manages the transaction log. Log entries can be written implicitly by the persistence layer 514 when data are written via a persistence interface or explicitly by using a log interface.

An authorization manager 554 can be invoked by other components of the architecture to check whether a user has the required privileges to execute the requested operations. Privileges can be granted to users or roles. A privilege grants the right to perform a specified operation (such as for example create, update, select, execute, and the like) on a specified object (such as for example a table, view, SQL Script function, and the like). Analytic privileges that represent filters or hierarchy drill down limitations for analytical queries can also be supported. Analytical privileges can grant access to values with a certain combination of dimension attributes. This could, for example, be used to restrict access to a cube with sales data to values with dimension attributes such as region="US" and year="2010."

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A non-transitory computer-readable storage medium storing instructions that, when executed by at least one programmable processor, cause the at least one programmable processor to perform operations comprising:
    evaluating, by a database management system, contents of each field of a plurality of fields in a table, wherein the evaluating comprises determining a scoring measure reflective of a uniqueness of content contained within each field, and wherein the scoring measure is based on a total number of distinct values contained within each field, a total number of occurrences for each of the distinct values contained within each field, and a total number of records in the database table;
    assigning, by the database management system, the respective scoring measure to each field of the plurality of fields in the table;
    sorting, by the database management system, each field of the plurality of fields based on the assigned scoring measures;
    automatically selecting, by the database management system and based on the assigned scoring measures, two or more fields of the sorted plurality of fields by at least determining that each of the respective scoring measures assigned to the two or more fields is within a defined range of acceptable scoring measures;
    receiving, at the database management system, an indication of a first level of fuzziness for performing a fuzzy search;
    executing, by the database management system, a first fuzzy search based on the selected two or more fields and the first level of fuzziness to obtain a first search result, wherein the execution of the first fuzzy search comprises concatenating a plurality of the selected two or more fields;
    automatically generating, by the database management system based on a number of records in the first search result, a second level of fuzziness by at least
        in response to determining that the number of records in the first search result is less than a lower threshold, assigning, to the second level of fuzziness, a value that is greater than the first level of fuzziness, and
        in response to determining that the number of records in the first search result is greater than an upper threshold, assigning, to the second level of fuzziness, a value that is less than the first level of fuzziness; and
    executing, by the database management system, a second fuzzy search based on the selected two or more fields and the second level of fuzziness, wherein the execution of the second fuzzy search comprises concatenating the plurality of the selected two or more fields.

2. The non-transitory computer-readable storage medium of claim 1, wherein the first level of fuzziness and the second level of fuzziness are based on a sliding scale indicating levels of fuzziness, and wherein the operations further comprise:
    receiving, by the database management system, an identifier of a table comprising a plurality of records having a plurality of fields.

3. The non-transitory computer-readable storage medium of claim 1, wherein the assigned scoring measures are calculated based on:

$$S_j = -\sum_{i=1}^{N} p_i \log p_i.$$

4. The non-transitory computer-readable storage medium of claim 1, wherein the operations further comprise:
    outputting, by the database management system, a second search result of the second fuzzy search, wherein the second search result comprises at least two records including at least one field having similar content.

5. The non-transitory computer-readable storage medium of claim 1, wherein to automatically select the two or more fields, the operations further comprise:

identifying, by the database management system, at least one first field having a higher scoring measure compared to at least one second other field; and selecting, by the database management system, one or more of the at least one first field having the higher scoring measure.

6. A method for implementation by one or more data processors forming part of at least one computing system, the method comprising:

evaluating, by a database management system, contents of each field of a plurality of fields in a table, wherein the evaluating comprises determining a scoring measure reflective of a uniqueness of content contained within each field, and wherein the scoring measure is based on a total number of distinct values contained within each field, a total number of occurrences for each of the distinct values contained within each field, and a total number of records in the database table;

assigning, by the database management system, a respective scoring measure to each field of the plurality of fields in the table;

sorting, by the database management system, each field of the plurality of fields based on the assigned scoring measures;

automatically selecting, by the database management system and based on the assigned scoring measures, two or more fields of the sorted plurality of fields by at least determining that each of the respective scoring measures assigned to the two or more fields is within a defined range of acceptable scoring measures;

receiving, at the database management system, an indication of a first level of fuzziness for performing a fuzzy search;

executing, by the database management system, a first fuzzy search based on the selected two or more fields and the first level of fuzziness to obtain a first search result, wherein the execution of the first fuzzy search comprises concatenating a plurality of the selected two or more fields;

automatically generating, by the database management system based on a number of records in the first search result, a second level of fuzziness by at least
in response to determining that the number of records in the first search result is less than a lower threshold, assigning, to the second level of fuzziness, a value that is greater than the first level of fuzziness, and
in response to determining that the number of records in the first search result is greater than an upper threshold, assigning, to the second level of fuzziness, a value that is less than the first level of fuzziness; and executing, by the database management system, a second fuzzy search based on the selected two or more fields and the second level of fuzziness, wherein the execution of the second fuzzy search comprises concatenating the plurality of the selected two or more fields.

7. The method of claim 6, wherein the first level of fuzziness and the second level of fuzziness are based on a sliding scale indicating levels of fuzziness, and wherein the method further comprises receiving, by the database management system, an identifier of a table comprising a plurality of records having a plurality of fields.

8. The method of claim 6, wherein the assigned scoring measures are calculated based on:

$$S_j = -\sum_{i=1}^{N} p_i \log p_i.$$

9. The method of claim 6, further comprising:
outputting, by the database management system, a second search result of the second fuzzy search, wherein the second search result comprises at least two records including at least one field having similar content.

10. The method of claim 6, wherein to automatically select the two or more fields, the method further comprises:
identifying, by the database management system, at least one first field having a higher scoring measure compared to at least one second other field; and
selecting, by the database management system, one or more of the at least one first field having the higher scoring measure.

11. A system comprising:
computer hardware comprising at least one programmable processor configured to perform operations comprising:
evaluating, by a database management system, contents of each field of a plurality of fields in a table, wherein the evaluating comprises determining a scoring measure reflective of a uniqueness of content contained within each field, wherein the scoring measure is based on a total number of distinct values contained within each field, a total number of occurrences for each of the distinct values contained within each field, and a total number of records in the database table;
assigning, by the database management system, the respective scoring measure to each field of the plurality of fields in the table;
sorting, by the database management system, each field of the plurality of fields based on the assigned scoring measures;
automatically selecting, by the database management system and based on the assigned scoring measures, two or more fields of the sorted plurality of fields by at least determining that each of the respective scoring measures assigned to the two or more fields is within a defined range of acceptable scoring measures;
receiving, at the database management system, an indication of a first level of fuzziness for performing a first fuzzy search;
executing, by the database management system, the first fuzzy search based on the selected two or more fields and the first level of fuzziness to obtain a first search result, wherein the execution of the first fuzzy search comprises concatenating a plurality of the selected two or more fields;
automatically generating, by the database management system based on a number of records in the first search result, a second level of fuzziness by at least
in response to determining that the number of records in the first search result is less than a lower threshold, assigning, to the second level of fuzziness, a value that is greater than the first level of fuzziness, and
in response to determining that the number of records in the first search result is greater than an upper threshold, assigning, to the second level of fuzziness, a value that is less than the first level of fuzziness; and
executing, by the database management system, a second fuzzy search based on the selected two or more fields and the second level of fuzziness, wherein the execution of the second fuzzy search comprises concatenating the plurality of the selected two or more fields.

12. The system of claim 11, wherein the first level of fuzziness and the second level of fuzziness are based on a sliding scale indicating levels of fuzziness, and wherein the operations further comprise:
   receiving, by the database management system, an identifier of a table comprising a plurality of records having a plurality of fields.

13. The system of claim 11, wherein the assigned scoring measures are calculated based on:

$$S_j = -\sum_{i=1}^{N} p_i \log p_i.$$

14. The system of claim 11, wherein the operations further comprise:
   outputting, by the database management system, a second search result of the second fuzzy search, wherein the second search result comprises at least two records including at least one field having similar content.

15. The system of claim 11, wherein to select the two or more fields, the operations further comprise:
   identifying, by the database management system, at least one first field having a higher scoring measure compared to at least one second other field; and
   selecting, by the database management system, one or more of the at least one first field having the higher scoring measure.

* * * * *